United States Patent [19]

Malofsky

[11] 3,855,040

[45] Dec. 17, 1974

[54] ANAEROBIC COMPOSITIONS

[75] Inventor: Bernard M. Malofsky, West Hartford, Conn.

[73] Assignee: Loctite Corporation, Newington, Conn.

[22] Filed: Apr. 2, 1973

[21] Appl. No.: 347,280

Related U.S. Application Data

[63] Continuation-in-part of Ser. No. 268,233, July 3, 1972, abandoned.

[52] U.S. Cl. ............... 156/310, 156/316, 156/332, 161/188, 260/89.5 A, 260/865
[51] Int. Cl. ......... C09j 5/04, C08f 3/62, B32b 7/10
[58] Field of Search .......... 156/310, 314, 316, 332; 260/45.7 R, 45.75 R, 89.5 A, 863, 865; 161/188

[56] References Cited
UNITED STATES PATENTS

| | | | |
|---|---|---|---|
| 3,046,262 | 7/1962 | Krieble | 260/89.5 |
| 3,218,305 | 11/1965 | Krieble | 260/89.5 |
| 3,577,346 | 5/1971 | McKeown | 252/63.5 |
| 3,591,438 | 7/1971 | Toback et al. | 156/310 |
| 3,658,624 | 4/1972 | Lees | 156/332 |

OTHER PUBLICATIONS

Chemical Abstracts, Vol. 64, No. 876f (1966) – "Curing Unsaturated Polyesters to Solid Resins."

*Primary Examiner*—Charles E. Van Horn
*Assistant Examiner*—Robert A. Dawson
*Attorney, Agent, or Firm*—Jean B. Mauro

[57] ABSTRACT

This invention concerns improved curable (polymerizable) anaerobic compositions which contain acrylate ester monomers, peroxy polymerization initiators, a strong acid, and an activator containing a ferrocene moiety, e.g., ferrocene, ferrocene derivatives or polymers incorporating ferrocene. By appropriate selection of the activator, cure speed can be controlled.

39 Claims, No Drawings

ANAEROBIC COMPOSITIONS

This application is a continuation in part of copending application, Ser. No. 268,233 filed July 3, 1972, now abandoned.

BACKGROUND OF THE INVENTION

This invention concerns anaerobic compositions, which have their primary utility in the area of polymerizable (curable) adhesives and sealants. Anaerobic compositions are commonly composed of curable unsaturated monomers, specifically acrylate ester monomers, in combination with peroxy polymerization initiators. While the peroxy initiator in the anaerobic composition is capable of polymerizing the monomer within a short time in the substantial absence of oxygen, such polymerization will not take place as long as the composition remains in adequate contact with oxygen.

The fact that the cure mechanism for anaerobic compositions is chemically blocked by atmospheric oxygen permits the composition to be stored in partially empty containers, preferably made of air permeable plastic such as low density polyethylene. Stored in such fashion, the anaerobic composition will remain in the liquid state. However, when placed between air impermeable surfaces, such as metal, glass, etc., the inhibiting influence of oxygen is lost and cure will commence in a relatively short time.

Two areas of particular interest in evaluating anaerobic compositions are the cure speed of the composition, and its ability to cure through gaps. For high speed production line applications where sealed or bonded articles cannot be stored for extended periods, and for equipment repair where prompt return to service is important, the highest possible rate of cure for the composition is desirable. (This assumes that the rapid cure speed does not produce overriding accompanying negative effects, such as undue embrittlement of the cured composition, or loss of other desirable properties.) Of additional and particular importance in anaerobic compositions is the cure-through-gap characteristic. As the gap (i.e., the space between the substrates to be sealed or bonded) becomes larger, the possibility of entrainment of atmospheric oxygen increases, and the area of the adhesive which is in contact with oxygen is also greater. Consequently, the inability to provide complete cure through large gaps has been a common problem with many anaerobic compositions.

Anaerobic compositions typically contain accelerators, ingredients which do not destroy the shelf stability of the product but which accelerate the rate of cure once it has been initiated during use conditions. While these ingredients do increase the speed of cure of the products, they have provided little, if any, assistance in generating the ability to cure through gaps. Increased speed of cure also is produced in commercial practice by the use of surface primers, chemical compounds which are applied to a surface prior to application of the anaerobic composition and which dramatically increase the speed of cure. These compounds have not been added directly to the anaerobic composition due to their extreme activity and tendency to destroy the shelf stability of the product. Typical examples of such surface primers are disclosed in, for example, U.S. Pat. No. 3,591,438 of Toback and O'Connor, issued July 6, 1971. Various organometallic compounds are commonly used as such surface primers.

An anaerobic composition, or an anaerobic composition and a surface primer therefor, which provide improved speed of cure characteristics, preferably also combined with the ability to cure through a gap such as from about 5 to about 30 mils, would be a highly useful and desirable improvement in the area of anaerobic compositions and a major advance in the art of sealing and bonding technology.

THE INVENTION

This invention concerns anaerobic compositions containing a polymerizable acrylate ester monomer; an activator containing a ferrocene moiety, such activator preferably selected from the group consisting of ferrocene, polymers incorporating ferrocene, the acyl, alkyl, hydroxyalkyl, alkenyl, and aryl derivatives of ferrocene, and mixtures thereof; a peroxy polymerization initiator for said monomer selected from the group consisting of hydroperoxide and perester compounds. The invention also contemplates a rapidly curing composition comprising the composition of the preceding sentence which additionally contains a strong acid.

This invention encompasses the composition as a whole, as described above, as well as two-part anaerobic compositions wherein the acrylate ester monomer and peroxy initiator, plus optionally either of the acid or activator, is used as a first part, and either or both of the acid and activator are used as a second part. In this two-part fashion, the second part most commonly is used as a surface primer prior to the application of the first part, although the second part can be mixed with the first immediately prior to use, if so desired.

Also included within the scope of this invention is the process for bonding substrates which involves applying to at least a portion of one of said substrates the above-described activator and/or acid surface primer (described above as the "second part"), applying to the same or a different substrate the monomer/peroxy initiator mixture (described above as the "first part"), and maintaining the substrates so treated in abutting relationship with the first part and second part in mutual contact until the anaerobic composition has cured to seal and/or bond said substrates together.

DISCUSSION OF THE INVENTION AND ITS PREFERRED EMBODIMENTS

The above-described compositions and processes produce outstanding use characteristics compared to prior art compositions. Speed of cure may be obtained which is as rapid or more rapid than most prior art systems, without materially affecting the strength, flexibility, toughness, etc., of the bond or seal which is formed. Such negative results frequently were encountered in rapidly curing prior art systems. In addition, the compositions of this invention have been found to produce improved cure through substantial gaps, such as up to 20 mils and in some cases even more, such as 30 mils.

This is a most surprising and unexpected result, particularly when dealing with a surface activator. It had been found previously that the most rapid-curing systems frequently produced the least desirable cure-through-gap properties, which probably was traceable to an extremely high surface polymerization which entraps the active polymerization accelerators in a high viscosity or solid layer near the surface, and prevents migration into the center of the gap. It was most surprising and unexpected to find the combination of properties presently achieved with the anaerobic compositions described herein.

As indicated above, the anaerobic composition has as required elements a polymerizable monomer and a peroxy initiator therefor which is latent, with respect to the polymerization, in the presence of oxygen, but which is capable of polymerizing the monomer at room temperature within a reasonable period of time after removal of the inhibiting effect of oxygen.

The most desirable monomers for use in anaerobic compositions are polymerizable acrylate esters, preferably having an average molecular weight of at least about 130. When used in the products of this invention, preferably at least a portion of the acrylate monomer is a di- or other polyacrylate ester. These polyfunctional monomers produce cross-linked polymers, which serve as more effective and more durable sealants and adhesives.

The polyacrylate esters may be represented by the formula

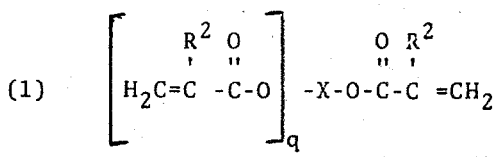

wherein $R^2$ is a radical selected from the group consisting of hydrogen, halogen and alkyl of from 1 to about 4 carbon atoms; $q$ is an integer equal to at least 1, and preferably equal to from 1 to about 4; and X is an organic radical containing at least 2 carbon atoms and having a total bonding capacity of $q$ plus 1. With regard to the upper limit for the number of carbon atoms in X, workable monomers exist at essentially any value. As a practical matter, however, a general upper limit is about 50 carbon atoms, preferably about 30, and most preferably about 20.

For example, X can be an organic radical of the formula

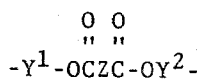

wherein each of $Y^1$ and $Y^2$ is an organic radical, preferably a hydrocarbon group, containing at least 2 carbon atoms, and preferably from 2 to about 10 carbon atoms, and Z is an organic radical, preferably a hydrocarbon group, containing at least 1 carbon atom, and preferably from 2 to about 10 carbon atoms. Other classes of useful polyacrylate ester monomers are the isocyanate-monoacrylate reaction products described in U.S. Pat. No. 3,425,988 to Toback and Gorman, issued Feb. 4, 1969, and the reaction products of di- or tri-alkylolamines (e.g., ethanolamines or propanolamines) with acrylic acids, such as are disclosed in French Pat. No. 1,581,361.

The most highly preferred acrylate esters which can be used in the compositions disclosed herein are polyacrylate esters which have the following general formula wherein $R^1$ represents a radical selected from the group consisting of hydrogen, lower alkyl of from 1 to about 4 carbon atoms, hydroxy alkyl of from 1 to about 4 carbon atoms, and

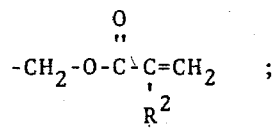

$R^2$ is a radical selected from the group consisting of hydrogen, halogen, and lower alkyl of from 1 to about 4 carbon atoms; $R^3$ is a radical selected from the group consisting of hydrogen, hydroxyl, and

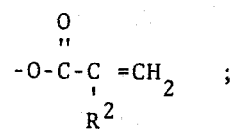

$m$ is an integer equal to at least 1, e.g., from 1 to about 15 or higher, and preferably from 1 to about 8; n is an integer equal to at least 1, e.g., 1 to about 40 or more, and preferably between about 2 and about 10; and p is one of the following: 0, 1.

Typical examples of polyacrylate esters corresponding to the above general formula are di-, and tetraethyleneglycol dimethacrylate; di(pentamethyleneglycol) dimethacrylate; tetraethyleneglycol diacrylate; tetraethyleneglycol di(chloroacrylate); diglycerol diacrylate; diglycerol tetramethacrylate; butyleneglycol dimethacrylate; neopentylglycol diacrylate; and trimethylolpropane triacrylate.

While di- and other polyacrylate esters—and particularly the polyacrylate esters described in the preceding paragraphs—have been found particularly desirable, monofunctional acrylate esters (esters containing one acrylate group) also may be used. When dealing with monofunctional acrylate esters, it is highly preferable to use an ester which has a relatively polar alcoholic moiety. Such materials are less volatile than low molecular weight alkyl esters and, more important, the polar group tends to provide intermolecular attraction during and after cure, thus producing more desirable cure properties, as well as a more durable sealant or adhesive. Most preferably the polar group is selected from the group consisting of labile hydrogen, heterocyclic ring, hydroxy, amino, cyano, and halogen polar groups. Typical examples of compounds within this category are cyclohexyl methacrylate, tetrahydrofurfuryl methacrylate, hydroxyethyl acrylate, hydroxypropyl methacrylate, t-butylaminoethyl methacrylate, cyanoethylacrylate, and chloroethyl methacrylate.

As indicated above, the anaerobic compositions as discussed herein are prepared by mixing a peroxy initiator with one or more acrylate esters. The peroxy initiators used in the compositions of this invention are hydroperoxides, preferably organic hydroperoxides, and organic peresters. The hydroperoxides are superior and constitute a preferred embodiment.

(2) 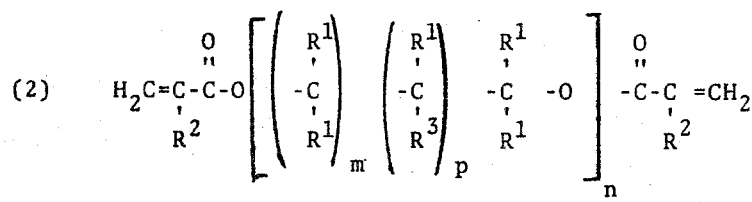 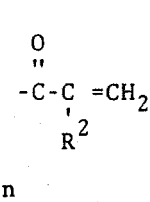

While the nature of the hydroperoxides is not critical to the broad concept of this invention, the general class of common hydroperoxides can be represented by the formula $R^4(OOH)_z$ wherein $R^4$ generally is a hydrocarbon group containing up to about 18 carbon atoms, and $z$ is 1, 2 or 3. Preferably, $z$ is 1 and $R^4$ is an alkyl, aryl or aralkyl hydrocarbon group containing from about 3 to about 12 carbon atoms. Naturally, $R^4$ can contain any substituent or linkage, hydrocarbon or otherwise, which does not affect the hydroperoxide adversely for the purpose disclosed herein. Typical examples of such hydroperoxides are cumene hydroperoxide, tertiary butyl hydroperoxide, methylethylketone hydroperoxide, and hydroperoxides formed by oxygenation of various hydrocarbons such as methylbutene, cetane, and cyclohexene, and various ketones and ethers, including certain compounds represented by the general formula (2) above.

The peresters used in the compositions of this invention are organic compounds containing the

linkage. The most common commercial products contain either two or, preferably, one of such linkages. The basic class of compounds may be represented by the formula

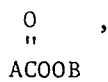

where the A and B radicals are each a hydrocarbon group containing up to about 10 carbon atoms, and preferably, an alkyl, aryl or aralkyl group. When the perester contains more than one perester linkage, A can be

and/or B can be.

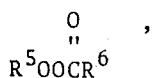

wherein $R^5$ and $R^6$ are hydrocarbon groups containing up to about 10 carbon atoms, $R^5$ preferably being an alkylene, arylene, or alkarylene group, and $R^6$ preferably being an alkyl, aryl or aralkyl group, B being as defined above. Naturally, A, B, $R^5$ and $R^6$ additionally can contain any substituent or linkage, hydrocarbon or otherwise, which does not adversely affect the perester for its intended use.

Examples of suitable perester polymerization initiators are t-butylperacetate; t-butyl peroxyisobutyrate; di-t-butyl diperphthalate; t-butyl perbenzoate; 2,5-dimethyl-2,5-bis(benzoylperoxy) hexane; and t-butyl peroxymaleic acid.

The peroxy initiators can be used within wide ranges, e.g., up to about 20 percent by weight of the composition. Most commonly, however, they comprise no more than about 10 percent by weight of the composition since above that level adverse effects on the strength and durability of the cured composition may be experienced. While in some instances lower amounts can be used, about 0.1 percent by weight of the composition is a common lower limit. Preferably, the peroxy initiator comprises from about 0.1 percent to about 5 percent by weight of the composition.

The compositions of this invention also require an effective amount of an activator comprising an organic compound containing a ferrocenyl moiety reactive to speed the cure of the polymerizable compositions disclosed herein. The activator may be selected from the group consisting of ferrocene, polymers incorporating ferrocene, the acyl, aryl, alkyl, hydroxyalkyl and alkenyl derivatives of ferrocene, and mixtures thereof. By "effective amount" is meant an amount or concentration of the activator, depending upon the reactivity of the particular activator used, sufficient to effect an improvement in cure speed and/or cure-through-gap performance of the polymerizable composition as compared with the unactivated composition. By "polymers incorporating ferrocene" is meant both polymers incorporating ferrocene in their backbone structure and polymers in which the ferrocenyl groups are pendant from the backbone structure.

Ferrocene is a unique crystaline solid having the chemical formula $(C_5H_5)_2Fe$. Ferrocene and its derivatives and polymers taught herein are highly stable organometallic compounds which perform unique functions in the anaerobic composition. Particularly surprising was the discovery that ferrocene and its derivatives and polymers could be incorporated in substantial amounts into the mixture of polymerizable acrylate ester monomer and peroxy polymerization initiator. Previously, inclusion of transition metal compounds, particularly iron, had been felt to be generally fatal to the stability of the anaerobic composition. In contrast, it has been found that ferrocene and its derivatives and polymers can be added in amounts up to about 1 percent by weight of the anaerobic composition, and even higher, without destroying the shelf stability of the product (provided the acidic substance to be discussed hereafter is not also present). Typically, no additional benefit is obtained at higher levels, and therefore they are not recommended. When the activator is added to the mixture of polymerizable acrylate ester monomer and peroxy polymerization initiator, it preferably is used in an amount between about 0.005 and about 1 percent, and most preferably between about 0.05 and about 0.3 percent by weight of the anaerobic composition. As indicated previously, the activator can be added directly to the anaerobic composition, or may be used alone or in combination with the acid as a second part of a two-part adhesive.

In addition to ferrocene, a wide variety of its derivatives are suitable for use in the instant invention. The useful aryl derivatives include phenyl, and alkyl, hydroxyl, and carboxyl substituted phenyl compounds. The useful acyl derivatives include acetyl, benzoyl, benxenesulfonyl, carbonyl, acid-ester and aldehyde compounds. The alkyl, cycloalkyl, hydroxyalkyl and alkenyl derivatives are not limited, except by economic considerations, as to the number of carbon atoms they may contain; however, it is preferable to limit such groups to about 20 carbons, more preferably about 10 carbons. The substituents may be present on either or both cyclopentadienyl rings. Multiple and/or mixed substituents may be present on either or both cyclopentadienyl rings. Any substituents may be employed which do not entirely destroy the ability of the ferrocenyl moiety to activate the cure. Suitable polymers may incorporate ferrocene units as pendant groups from the backbone chain or may be polymers of ferrocene itself or of its derivatives, e.g., an alkyl adduct containing about 1 to 6 carbon atoms. Either or both of the cyclopentadienyl groups in any ferrocene unit of the polymer may be substituted. There is no particular limit on the molecular weight of such polymers; however, as a practical matter, relatively low viscosities are preferred, suggesting use of lower molecular weights, e.g., up to about 20 dicyclopentadienyl iron units.

A disadvantageous property of ferrocene is its relatively high volatility, which is of significance when the anaerobic composition is applied to a mechanical part to be adhered or sealed well in advance of the assembly of the part. The high volatility will limit the on-part life of the composition. Volatility can be controlled, for example, by use of the polymers of this invention or derivatives containing strongly polar groups, such as the acid-esters. An example of such an acid-ester is the reaction product of hydroxyethyl ferrocene with maleic anhydride.

The reactivity of the activator, i.e., its effect on cure speed of the anaerobic composition, depends upon the particular activator compound chosen. Thus, for example, cure speed can be regulated by appropriate selection of ferrocenic derivative or mixture of derivates, permitting the cure system to be tailored to specific uses. Without intending to be bound by any chemical theory, it is believed that cure speed is accelerated, relative to that produced by ferrocene, by substituent groups tending to contribute electrons to the iron nucleus (e.g., alkyl, cycloalkyl), and retarded by groups tending to withdraw electrons (e.g., acyl, alkenyl). The electron-contributing groups constitute a preferred embodiment since they tend to retain the cure-through-gap speed obtained with unsubstituted ferrocene. Although most electron-withdrawing groups significantly improve cure-through-gap properties over the prior art, they do tend to retard such cure speed relative to unsubstituted ferrocene.

As previously indicated, the above-described ingredients are used in combination with a strong acid, preferably an acid having a pKA less than about 3.0, preferably less than 2.0, and most preferably 1.5 or less. The acid should be reasonably soluble in the remainder of the anaerobic composition to facilitate distribution throughout the polymerizable mixture. While it is not absolutely essential, it is preferable for the acid to be an organic acid. While the extremely low pKA acids perform exceptionally well, it is not essential to go to extremely strong acids, and frequently it is desirable to avoid using such compounds in view of the hazards and corrosivity problems involved. Mixtures of acids may also be used.

Typical examples which fall within the broad or preferred ranges discussed above are sulfonic acids such as toluene sulfonic acid, nitrotoluene sulfonic acid, and propane sulfonic acid; dichloro- and trichloroacetic acids; phosphonic acids such as benzene phosphonic acid. Other useful acids include maleic, malonic, acetylene acids such as acetylene carboxylic and acetylene dicarboxylic, and saccharin, maleic acid and/or saccharin being preferred.

When the acid is added to the mixture of polymerizable acrylate ester monomer and peroxy polymerization initiator (in the absence of the activator, which then would be used as a second component), the content of the acid should be between about 0.01 and about 5 percent by weight of the anaerobic composition. Higher amounts can be used but are unnecessary, and no benefit in terms of cure speed and cure through gap capability generally is achieved. A preferred range is between about 0.1 and about 4 percent and most preferably between about 0.2 and about 3 percent weight of the anaerobic composition.

When the activator and acid are mixed and together used as a second component, the balance between the two can vary within wide ranges. The key is to insure that an adequate minimum amount of each is used. Since the second component preferably is applied as a surface primer, the ingredients preferably are dissolved in a volatile solvent. A suitable use level of activator in the solvent is between about 0.05 and about 10 percent, and preferably about 0.1 and about 5 percent by weight of the solution. Comparable levels for the strong acid are between about 0.1 and about 5 percent, and preferably between about 0.5 and about 3 percent.

The solvent used is one which will readily evaporate, e.g., one which will evaporate from a thin film in less than about 5 minutes, and preferably less than 2 minutes at room temperature. When used in aerosol containers, solvents which are liquids at the internal pressure of the pressurized container, but gasses at conditions of standard temperature and pressure, also may be used. Examples of solvents which generally can be used, singly or in combination, are benzene and toluene; chlorinated and/or fluorinated hydrocarbons such as trichloromonofluoroethane, methylene chloride, methylchloroform, trichloroethylene, and trichloroethane; lacquer-type solvents, such as acetone, ethylacetate and methylethylketone; and alcohols, such as ethanol, propanol and isopropanol. The solvent solution of active ingredients then can be applied directly to the substrate to be bonded and the solvents will evaporate, leaving a coating of the surface activator upon the substrates. Since the primer can be applied in a number of coatings or a coating of any predetermined intensity, the amounts of active ingredients dissolved in the solvent are not critical, and the general use ranges have been given previously.

There are numerous optional additives which can be incorporated in anaerobic compositions, as is known in the art. Many of these additives can be used in the compositions of this invention. The most common additives are latent polymerization accelerators, compounds which do not of themselves initiate cure, but which accelerate the cure once it has been started by the polymerization initiator. It should be noted that large numbers of polymerization accelerators are known in the art, and the broad concept of this invention is intended to encompass any polymerization accelerator which can be incorporated in the anaerobic composition without destroying the essential characteristics of such composition. However, in view of the exceptional cure characteristics of the compositions of this invention, additional accelerators usually will not be required.

By way of example only, classes of such accelerators which may be used if desired are primary, secondary or tertiary organic amines containing up to about 20, preferably 15, carbon atoms; organic sulfimides containing up to about 15 carbon atoms; and amides containing up to about 10 carbon atoms. These accelerators generally are used within the range of 0.2 to about 5 percent by weight of the composition.

Another common class of additives is the polymerization inhibitors, which offer protection against spurious polymerization of the acrylate ester monomer prior to the time of intended use, such as during storage. The quinones have been found to be a particularly effective class of polymerization inhibitors, and can be used herein. Examples of such quinones are β-naphthoquinone, 2-methoxy-1,4-naphthoquinone, and p-benzoquinone. Other inhibitors are hydroquinone and stable nitroxide free radicals. These inhibitors are commonly used at levels between about 50 and 500 parts per million by weight of the anaerobic composition.

Other typical ingredients which can be used if desired to impart commercially desirable properties to the composition are thickeners, dyes, adhesive agents and thixotropic agents. Such materials can be used in such combination and proportions as desired, provided they do not adversely affect the anaerobic nature of the composition, or other essential properties thereof.

The anaerobic compositions described above can be used in a variety of processes to seal or bond substrates. For example, the above-described ingredients can be mixed and the total composition applied as a whole to the substrates. When this type of process is used, it is preferable to mix all the ingredients in advance except for the strong acid or the activator. In view of the rapid curing characteristics of the fully mixed system, the last ingredient is added immediately prior to the sealing or bonding operation. Even with such an operation, care must be taken with this process in view of the extreme speed of cure of this composition. It often will be difficult to apply the composition and properly position the substrates before substantial cure takes place.

As a result, it generally is preferable in the bonding operation to utilize the surface activation approach, in which either the acid or the activator combination is applied to either or both of the substrates as a first step. The balance of the composition (the monomer/initiator mixture, plus any additives which may be used) is applied to either or both of the substrates as a second operation. It has been found that in this way the bonding operation is completed much more quickly following contact of the various active ingredients, and hence there is little danger of excessive cure taking place prior to completion of the bonding operation.

Unlike many prior art surface primers, the strong acid and activators of this invention do not readily chemically degrade upon exposure to oxygen and hence can be applied to substrates well in advance of application of the balance of the adhesive or sealant composition. This can be extremely beneficial in production line applications.

Following application of the composition to the substrates by whichever method is used, the substrates then are maintained in the predetermined relationship in which they are to be sealed or bonded until sufficient cure has taken place. While slightly longer times are required for the larger gaps, it has generally been found that cure will proceed sufficiently within a matter of minutes that outside fixturing of the substrates is not necessary. In thin bond lines, such as 3 mils or less, this "fixturing" commonly takes place in a matter of seconds.

As indicated above, even when the surface activator technique is utilized the cure will proceed through substantial gaps, such as 20 mils or even greater, within a reasonably short period of time. This was a most surprising and unexpected development, as has been explained above.

EXAMPLES

The following examples are given to demonstrate processes, compositions and bonded assemblies within the scope of the invention disclosed herein. The examples are not intended to be limitations in any way upon the scope of the invention. Unless specifically stated to the contrary, all ratios and percentages in the following examples are on a weight basis.

EXAMPLE I

A Control Anaerobic Composition was prepared by adding 4 percent cumene hydroperoxide to polyethyleneglycol dimethacrylate (number average molecular = 330). The mixture was treated with 0.05 percent tributylamine to remove any residual acids that may have been present in the monomer. Three samples were taken from the Control Anaerobic Composition, the first of which was allowed to remain unaltered. To the second sample was added 100 parts per million by weight ferrocene, and to the third sample was added 100 parts per million by weight iron pentanedione. The shelf stability of the above three portions then was determined by use of a standard stability test in which a test tube of the sample in question was suspended in an 82°C constant temperature bath. The length of time until the first gelled material appears in the test tube is taken as a measure of the shelf stability of the product. About 30 minutes is considered the minimum acceptable amount of time for compositions of this type, and a preferred time is 60 minutes. The stability of the first sample was found to be 295 minutes, the second sample 240 minutes, and the third sample less than 1 minute. This Example demonstrates the surprising stability of anaerobic compositions to which ferrocene has been added.

EXAMPLE II

An additional sample was taken from the Control Anaerobic Composition of Example I, and to it was added 0.05 percent by weight ferrocene. This sample then was used in combination with a "primer" composed of 2% by weight trichloroacetic acid in methylchloroform. The cure characteristics of the combination were measured by determining the "fixture time" on 1 inch by 3 inch glass slides. In this test the primer is applied to at least about 1 inch of the end of each of two glass slides, and the solvent allowed to evaporate. A drop of the sample of the anaerobic composition then is applied to the primed or treated area of one of said glass slides, and the primed area of the second glass slide is immediately placed thereover in aligned overlapping relationship. The time is noted when one slide cannot be moved relative to the other by application of light pressure with the finger. In this test the fixture time was found to be less than 5 seconds.

The above test was repeated, adjusting the gap between the two glass slides to approximately 20 mils, using 20 mil diameter wire as spacers. The fixture time in this test was found to be less than 5 minutes. The Control Anaerobic Composition at this gap does not fixture within 24 hours.

EXAMPLE III

An additional sample was taken from the Control

Anaerobic Composition of Example I, and to this sample was added 1 percent by weight toluene sulfonic acid. The tests described in Example II were repeated, except that in this Example the primer was a 0.5 percent by weight solution of ferrocene in methylchloroform. The fixture time on glass slides in this test was about 2 seconds, and the fixture time on glass slides with a 20 mil gap was less than 5 minutes.

EXAMPLE IV

Two primers were prepared for use in this Example, Primer A containing 2 percent by weight nitrotoluene sulfonic acid and 1 percent ferrocene, and Primer B containing 2 percent by weight nitrotoluene sulfonic acid and 0.5 percent by weight ferrocene. A Control Primer containing only 0.5 percent ferrocene (and no strong acid) also was utilized. In each case, the solvent was methychloroform. Each of these primers then was used in combination with a variety of monomer/peroxy initiator mixtures, as shown in Table I below. In each case, the polymerizable monomer was the polyethyleneglycol dimethacrylate of Example I. All the combinations described below were tested for fixture time on glass slides, and in each case the fixture time was 10 seconds or less. The compositions were also tested on glass slides with 20 mil gaps, and the fixture times are reported below in Table I.

Table I

| Peroxy Initiator | Fixture Time - Glass Slides, 20 mil Gap | | |
|---|---|---|---|
| | Primer A | Primer B | Control |
| Cumene Hydroperoxide (4% by weight) | 7 min. | 10 min. | >1 hr. |
| t-Butyl Perbenzoate | 5 min. | 5 min. | >1 hr. |
| t-Butyl Hydroperoxide | 6 min. | 12 min. | >3 hr. |

EXAMPLE V

A sample of the Control Anaerobic Composition of Example I, to which had been added 500 parts per million by weight ferrocene, was used in combination with primers containing various acids. The fixture times on glass slides were determined, as described in the preceding Examples. In each case the acid was applied as a 2 percent by weight solution in methylchloroform. The acids used, and the fixture times obtained, are presented below in Table II.

Table II

| Acid | Fixture Time |
|---|---|
| Nitrotoluene Sulfonic | 10 seconds |
| Trichloroacetic | 5 seconds |
| Toluene Sulfonic | 10 seconds |
| Dichloroacetic | 15 seconds |

EXAMPLE VI

A methacrylate-capped urethane compound was prepared by condensing a diisocyanate with hydroxyethyl methacrylate. With this was mixed about 0.3 percent by weight saccharin, about 2.7 percent by weight cumene hydroperoxide, and about 1 percent by weight maleic acid, thereby forming an Anaerobic Adhesive Composition. This was applied to steel nuts and bolts (size ⅜-24) which had been primed with a methyl chloroform solution of either ferocene (2% by weight) or one of various ferrocene derivatives (1% by weight). The ferrocene polymer shown in Table III is a low molecular weight material having the following repeating group:

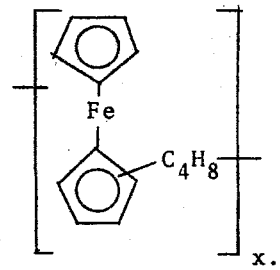

The average torque in inch-pounds required to cause movement of the nut relative to the bolt (i.e., "break" the polymeric "lock") was measured at various times following assembly of a series of such nuts and bolts, and these torque measurements used as an indication of cure speed of the anaerobic composition. The various activators used, and the corresponding results obtained, are presented below in Table III.

Table III

| Activator | Torque (in-lbs) obtained at various Cure Times | | |
|---|---|---|---|
| | 5 minutes | 15 minutes | 24 hours |
| Ferrocene | 60 | 120 | 215 |
| Acetyl ferrocene | 2 | 3 | 230 |
| Benzoyl ferrocene | loose | 2 | 230 |
| Hydroxyethyl ferrocene | 55 | 100 | 160 |
| 1,1'-dibutyl ferrocene | 140 | 160 | 220 |
| Butyl ferrocene | 160 | 165 | 230 |
| Ferrocene polymer | 150 | 220 | 270 |

EXAMPLE VII

A Polymerizable Anaerobic Composition was prepared by adding about 3 percent by weight maleic acid and about 2 percent by weight cumene hydroperoxide to polyethyleneglycol dimethacrylate. The viscosity of the composition was less than about 500 centipoises. Primer solutions were prepared by dissolving ferrocene and the derivatives shown below in methyl chloroform. The ferrocene was 2 percent by weight of the solution; the derivatives were 1 percent by weight. Fixture tests at 20 mils gap were performed, as described in Example II. Fixture times are shown in Table IV. All samples produced a strong bond.

Table IV

| Activator | Time for fixture at 20-mil gap | |
|---|---|---|
| Ferrocene | 18 | minutes |
| Hydroxyethyl ferrocene | 15 | do. |
| Butyl ferrocene | 25 | do. |
| Dibutyl ferrocene | 27 | do. |
| t-Amyl ferrocene | 35 | do. |
| Acetyl ferrocene | 5 | hours |
| Benzoyl ferrocene | >6 <18 | do. |

I claim:

1. A polymerizable anaerobic composition comprising a polymerizable acrylate ester monomer; hydroperoxide or a perester polymerization initiator capable of polymerizing said monomer in the substantial absence of oxygen; and an effective amount for rapid polymerization of the acrylate ester monomer of an activator comprising an organic compound containing a ferrocene moiety.

2. The composition of claim 1 wherein the acrylate ester monomer has a molecular weight of at least about 130 and the polymerization initiator is a hydroperoxide containing up to about 18 carbon atoms.

3. The composition of claim 1 wherein the activator is selected from the group consisting of ferrocene, polymers incorporating ferrocene, the acyl, aryl, alkyl, hydroxyalkyl and alkenyl derivatives of ferrocene, and mixtures thereof.

4. The composition of claim 3 wherein the activator is ferrocene.

5. The composition of claim 3 wherein the activator is a ferrocene polymer incorporating up to about 20 dicyclopentadienyl iron units.

6. The composition of claim 5 wherein one or both of the cyclopentadienyl groups are substituted.

7. The composition of claim 3 wherein the activator is an acetyl, benzoyl or benzenesulfonyl derivative of ferrocene.

8. The composition of claim 3 wherein the activator is an alkyl derivative of ferrocene.

9. The composition of claim 3 wherein the activator is a hydroxyalkyl derivative of ferrocene.

10. The composition of claim 3 wherein the activator is an alkenyl derivative of ferrocene.

11. The composition of claim 3 wherein the activator is an aryl derivative of ferrocene.

12. The composition of claim 1 wherein the activator is present in an amount between about 0.005 and 1 percent by weight of the composition.

13. The composition of claim 1 containing in addition a strong acid.

14. The composition of claim 13 wherein the strong acid has a pKA of less than about 3.

15. The composition of claim 14 wherein the strong acid has a pKA of less than about 2.

16. A two-part polymerizable anaerobic composition consisting essentially of:
A. A first part comprising a polymerizable acrylate ester monomer; a peroxy polymerization initiator capable of polymerizing said monomer in the substantial absence of oxygen, said polymerization initiator being selected from the group consisting of hydroperoxides and peresters; and
B. A second part comprising an activator comprising an organic compound containing a ferrocenyl moiety.

17. The composition of claim 16 containing in addition an acid having a pKA of less than about 3.

18. The composition of claim 17 wherein the polymerizable acrylate ester has the formula

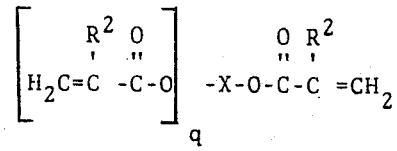

wherein $R^2$ is a radical selected from the group consisting of hydrogen, halogen and alkyl of from 1 to about 4 carbon atoms; $q$ is an integer equal to at least 1; and X is an organic radical containing at least two carbon atoms and having a total bonding capacity of $q$ plus 1.

19. The composition of claim 18 wherein $q$ is equal to from 1 to about 4.

20. The composition of claim 18 wherein the peroxy polymerization initiator comprises from about 0.1 to about 10 percent by weight of the composition and is selected from the group consisting of:
A. Hydroperoxides of the formula $R^4(OOH)_z$ wherein $R^4$ is a hydrocarbon group containing up to about 18 carbon atoms; and
B. Peresters of the formula $$ACOOB \atop \|\atop O$$

wherein A is

or a hydrocarbon group containing up to about 10 carbon atoms, B is

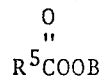

or a hydrocarbon group containing up to about 10 carbon atoms, and $R^5$ and $R^6$ are hydrocarbon groups containing up to about 10 carbon atoms.

21. The composition of claim 17 wherein the activator is selected from the group consisting of ferrocene, polymers incorporating ferrocene, the acyl, aryl, alkyl, hydroxyalkyl and alkenyl derivatives of ferrocene, and mixtures thereof.

22. The composition of claim 21 wherein the activator is ferrocene.

23. The composition of claim 21 wherein the activator is a ferrocene polymer incorporating up to about 20 dicyclopentadienyl iron units.

24. The composition of claim 23 wherein one or both of the cyclopentadienyl groups are substituted.

25. The composition of claim 21 wherein the activator is an acetyl, benzoyl or benzenesulfonyl derivative of ferrocene.

26. The composition of claim 21 wherein the activator is an alkyl derivative of ferrocene.

27. The composition of claim 21 wherein the activator is a hydroxyalkyl derivative of ferrocene.

28. The composition of claim 21 wherein the activator is an alkenyl derivative of ferrocene.

29. The composition of claim 21 wherein the activator is an aryl derivative of ferrocene.

30. The composition of claim 21 wherein the second part is dossolved in a volatile solvent, the activator comprises between about 0.05 and about 10 percent by weight of the second part, and the acid comprises between about 0.1 and about 5 percent by weight of the second part.

31. A two-part polymerizable composition consisting essentially of:
A. A first part comprising a polymerizable acrylate ester monomer; from about 0.005 to about 1 percent by weight of an activator comprising an organic compound containing a ferrocenyl moiety; and from about 0.1 to about 10 percent by weight of a peroxy polymerization initiator capable of polymerizing said monomer in the substantial absence of oxygen, said polymerization initiator being selected from the group consisting of hydroperoxides and peresters; and B. A second part comprising an acid having a pKA of less than about 3.

32. The composition of claim 31 wherein the activator is selected from the group consisting of ferrocene, polymers incorporating ferrocene, the acyl, aryl, alkyl, hydroxyalkyl and alkenyl derivatives of ferrocene, and mixtures thereof.

33. A two-part polymerizable anaerobic composition consisting essentially of:

A. A first part comprising a polymerizable acrylate ester monomer; from about 0.01 to about 5 percent by weight of an acid having a pKA of less than about 3, and from about 0.1 to about 10 percent by weight of a peroxy polymerization initiator capable of polymerizing said monomer in the substantial absence of oxygen, said polymerization initiator being selected from the group consisting of hydroperoxides and peresters; and B. A second part comprising an activator comprising an organic compound containing a ferrocenyl moiety.

34. The composition of claim 33 wherein the activator is selected from the group consisting of ferrocene, polymers incorporating ferrocene, the acyl, aryl alkyl, hydroxyalkyl and alkenyl derivatives of ferrocene, and mixtures thereof.

35. The composition of claim 34 wherein the activator is dissolved in a volatile solvent.

36. A process for sealing or bonding substrates which comprises:

A. Applying to at least one of said substrates a primer composition comprising a mixture of an acid having a pKA less than about 3 and an activator comprising an organic compound containing a ferrocenyl moiety; and B. Applying to at least one of said substrates a polymerizable composition comprising a polymerizable acrylate ester monomer and a peroxy polymerization initiator capable of polymerizing said monomer in the substantial absence of oxygen, said polymerization initiator being selected from the group consisting of hydroperoxides and peresters;

C. And thereafter placing said substrates in an abutting relationship until the polymerizable composition has hardened sufficiently to seal or bond said substrates.

37. The process of claim 36 wherein the activator is selected from the group consisting of ferrocene, polymers incorporating ferrocene, the acyl, aryl, alkyl, hydroxyalkyl and alkenyl derivatives of ferrocene, and mixtures thereof.

38. The process of claim 36 wherein the activator is contained in said polymerizable composition, and is deleted from said primer composition.

39. The process of claim 36 wherein the acid is contained in said polymerizable composition, and is deleted from said primer composition.

* * * * *

UNITED STATES PATENT OFFICE
CERTIFICATE OF CORRECTION

PATENT NO. : 3,855,040
DATED : December 17, 1974
INVENTOR(S) : Bernard M. Malofsky It is certified that error appears in the above-identified patent and that said Letters Patent are hereby corrected as shown below:

Column 8, line 7 - after the word "percent"
  insert the word -- by --.

Column 11, line 18 - delete the word "methychloroform"
  and insert the word -- methylchloroform --.

Signed and Sealed this

Twenty-sixth Day of October 1976

[SEAL]

Attest:

RUTH C. MASON
*Attesting Officer*

C. MARSHALL DANN
*Commissioner of Patents and Trademarks*